United States Patent
Sawayanagi (10) Patent No.: US 6,799,743 B2
(45) Date of Patent: Oct. 5, 2004

(54) BRACKET FOR MOUNTING AUXILIARY MACHINERY TO VEHICLE BODY

(75) Inventor: Masahiro Sawayanagi, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 62 days.

(21) Appl. No.: 09/814,126

(22) Filed: Mar. 22, 2001

(65) Prior Publication Data

US 2001/0025909 A1 Oct. 4, 2001

(30) Foreign Application Priority Data

Mar. 23, 2000 (JP) .................................... P 2000-082565

(51) Int. Cl.[7] ................................................. G12B 9/00
(52) U.S. Cl. .................. 248/27.1; 248/27.3; 248/224.8; 248/231.9; 296/97.11; 296/97.12; 296/97.9
(58) Field of Search ............................. 248/27.1, 27.3, 248/292.12, 288.11, 231.9, 220.22, 222.31, 224.8, 222.41, 289.11; 296/97.11, 97.12, 97.9; 439/537

(56) References Cited

U.S. PATENT DOCUMENTS

| | | | | |
|---|---|---|---|---|
| 3,017,217 A | * | 1/1962 | Keating | 248/289.11 |
| 5,031,954 A | * | 7/1991 | Peterson et al. | 296/97.13 |
| 5,201,564 A | * | 4/1993 | Price | 296/97.12 |
| 5,499,854 A | * | 3/1996 | Crotty et al. | 296/97.13 |
| 5,857,728 A | * | 1/1999 | Crotty et al. | 296/97.9 |
| 5,975,617 A | * | 11/1999 | Jacquemin et al. | 248/289.11 |
| 6,003,928 A | * | 12/1999 | Curtindale | 296/214 |
| 6,068,323 A | * | 5/2000 | Brown et al. | 248/292.13 |
| 6,250,708 B1 | * | 6/2001 | Kurachi | 296/97.9 |
| 6,287,142 B1 | * | 9/2001 | Sawayanagi et al. | 439/351 |
| 6,325,667 B2 | * | 12/2001 | Sawayanagi | 439/34 |
| 6,340,193 B1 | * | 1/2002 | Sawayanagi | 248/274.1 |
| 6,406,087 B2 | * | 6/2002 | Sawayanagi | 248/27.3 |
| 6,428,078 B1 | * | 8/2002 | Beaver | 296/97.13 |
| 6,511,029 B2 | * | 1/2003 | Sawayanagi | 248/224.8 |

\* cited by examiner

Primary Examiner—Kimberly T. Wood
(74) Attorney, Agent, or Firm—Finnegan, Henderson, Farabow, Garrett, & Dunner, L.L.P.

(57) ABSTRACT

In a visor side bracket 5, a sun visor is arranged in a lower surface side, a shaft supporting portion 8 fitting a fixing shaft 4 to an upper surface side is protruded, and a guide portion 12 is formed near a peripheral wall portion of the shaft supporting portion 8. On the contrary, a guide groove 23 structured such that the guide portion 12 is inserted in a sliding manner by assembling the visor side bracket 5 is formed in a panel side bracket 6.

10 Claims, 9 Drawing Sheets

FIG.1

PRIOR ART

FIG.2

PRIOR ART

FIG.3

PRIOR ART

FIG.4

PRIOR ART

BRACKET FOR MOUNTING AUXILIARY MACHINERY TO VEHICLE BODY

BACKGROUND OF THE INVENTION

The present invention relates to a bracket for mounting an auxiliary machinery to a vehicle body, and more particularly to a bracket for mounting, for example, a sun visor with an electrical equipment or the like to a vehicle body.

Figure 1:
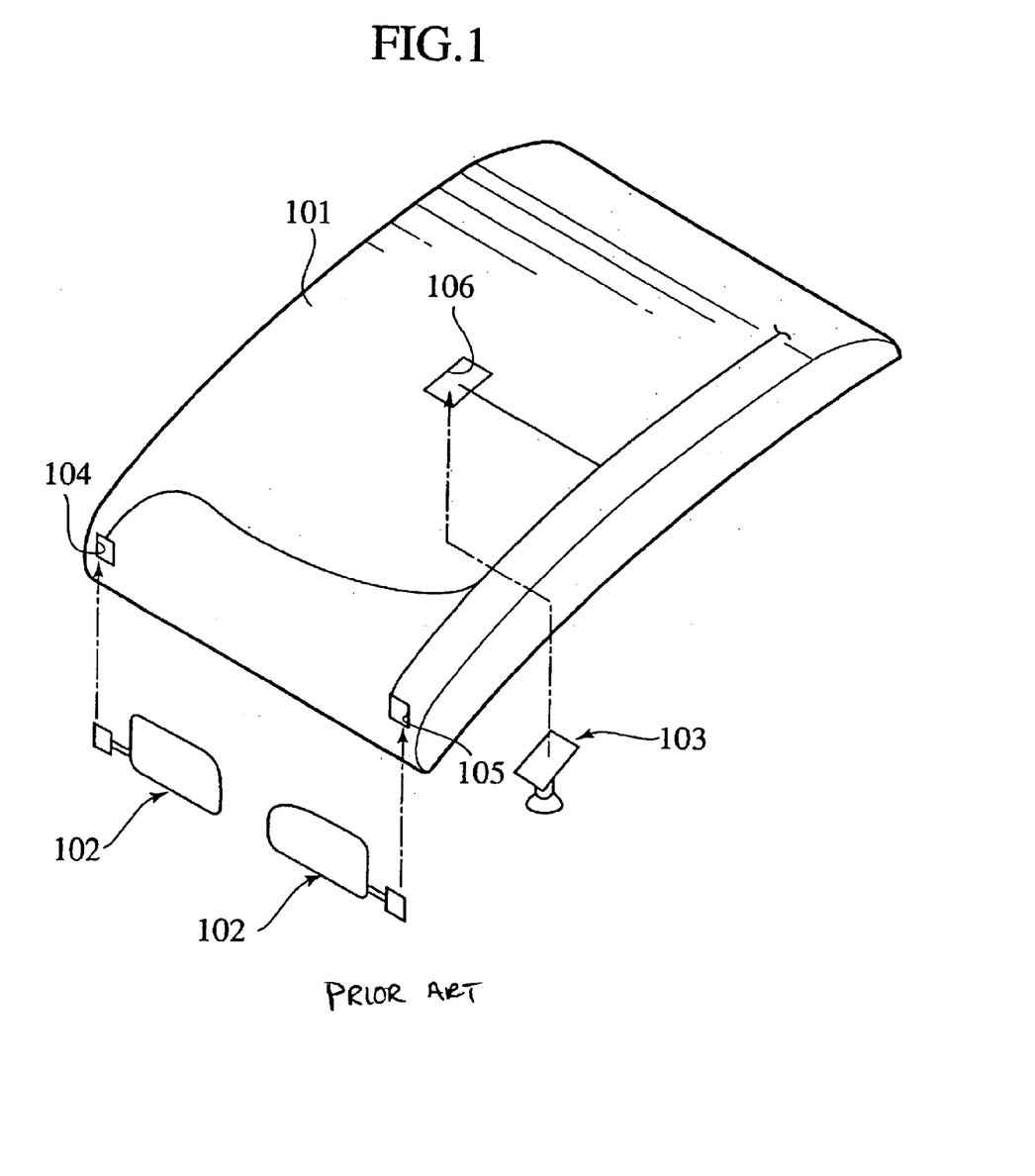
FIG. 1 is a perspective view describing an auxiliary machinery mounting position in an inner panel and a roof trim of an automobile.

As an auxiliary machinery provided in an automobile, as shown in FIG. 1, there are, for example, a sun visor 102 with an electrical equipment placed in a roof trim 101 above a driver's seat and an assistant driver's seat, a movable room lamp 103 placed substantially at a center of the roof trim 101 and the like. Mounting opening portions 104, 105 and 106 are formed at respective positions of the roof trim 101 where the auxiliary machinery is mounted, as shown in FIG. 1. These sun visors 102 and the room lamp 103 are mounted to the mounting opening portions 104, 105 and 106 by using a bracket for mounting to a vehicle body.

Figure 2:
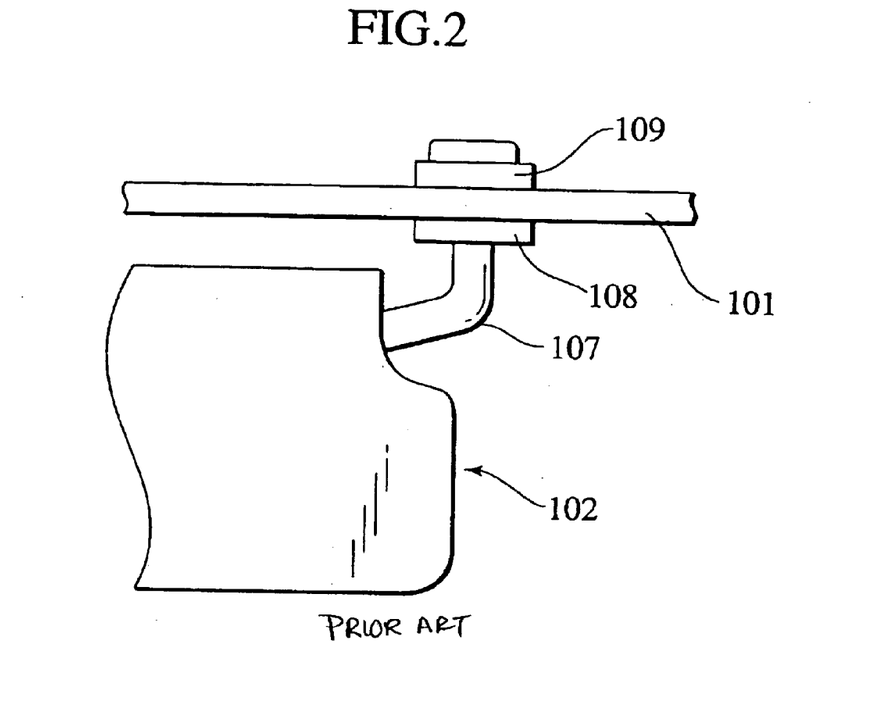
FIG. 2 is a side elevational schematic view showing a mounting structure of a sun visor according to a conventional art.

In a first technique which the inventors have considered, as shown in FIG. 2, the sun visor 102 is mounted to the roof trim 101 including an inner panel (not shown) by using a visor side bracket 108 provided in a front end portion of a fixed shaft 107 and a panel side bracket 109. In this case, the visor side bracket 108 and the panel side bracket 109 are fixed to the roof trim 101 by being screwed.

Figure 3:
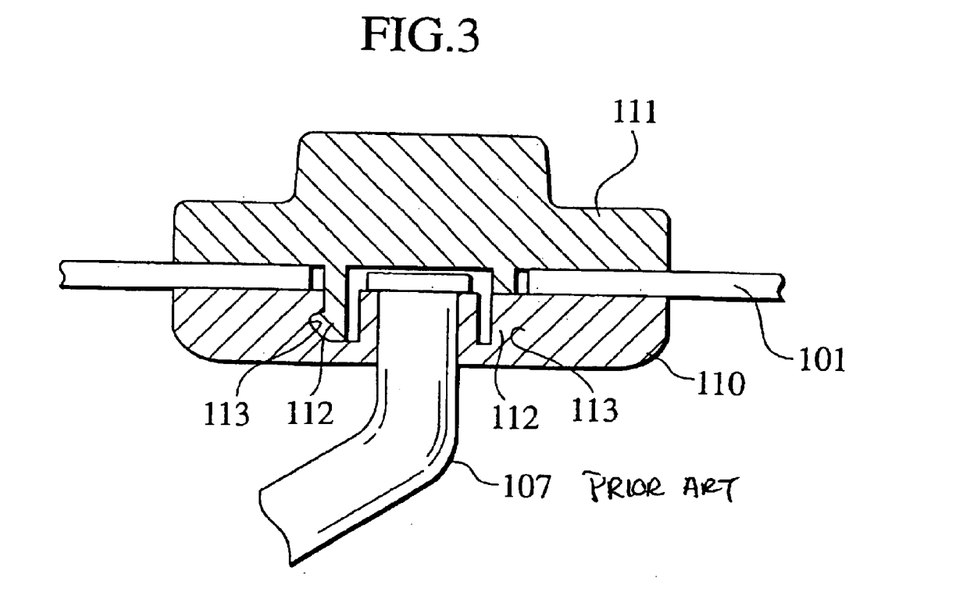
FIG. 3 is a partly cross sectional view showing a mounting structure using another mounting bracket for a sun visor according to a conventional art.

Further, as a second technique, there is a structure shown in FIG. 3. In this mounting structure, a visor side bracket 110 to which the front end portion of the fixed shaft 107 is rotatably mounted is attached and mounted to a panel side bracket 111 fixed to the roof trim 101 side. In particular, the panel side bracket 111 is provided with an engaging piece 112 protruding downward, and the visor side bracket 110 is provided with an engagement portion 113 engaged with the engaging piece 112 of the panel side bracket 111. At a mounting time, an operation of pressing the visor side bracket 110 to the panel side bracket 111 is performed so that the engaging piece 112 of the panel side bracket 111 fixed to the roof trim 101 side is inserted to the engagement portion 113.

Figure 4:
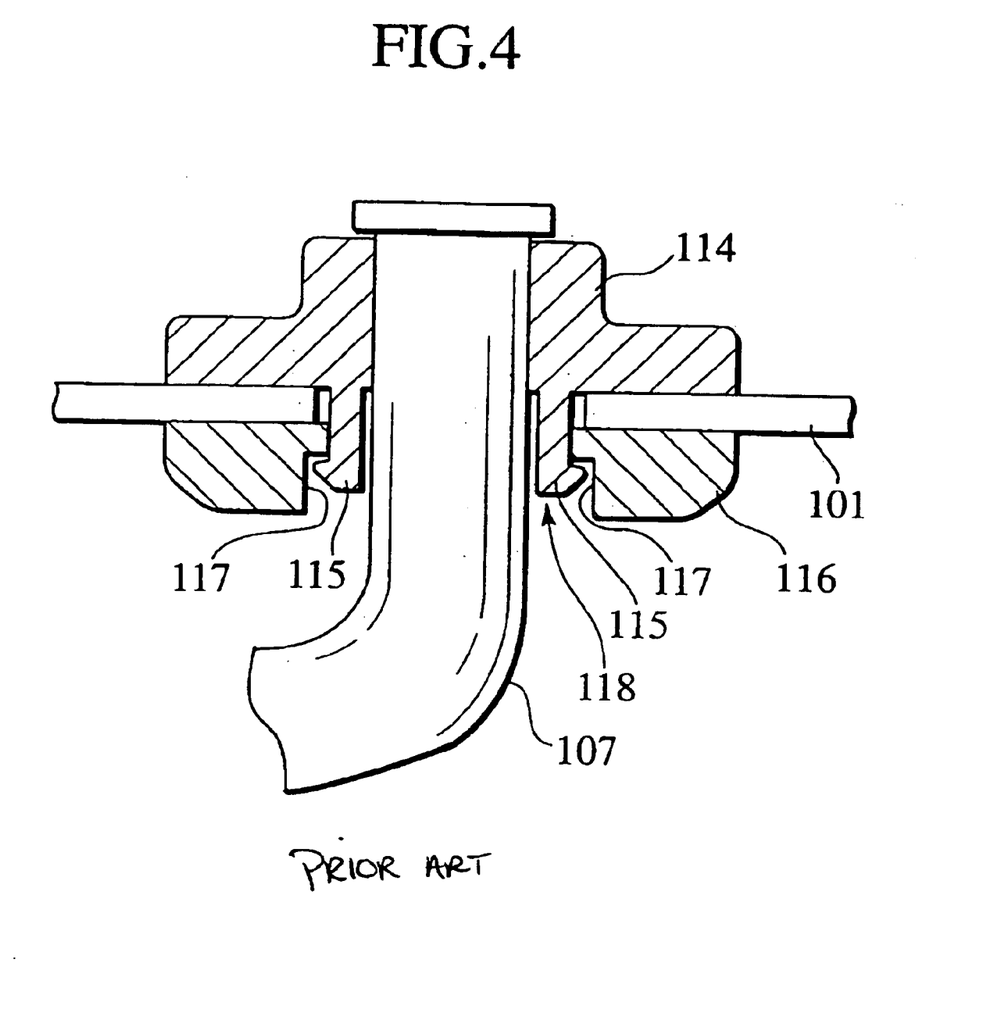
FIG. 4 is a partly cross sectional view showing a mounting structure using another mounting bracket for a sun visor according to a conventional art.

Further, as a third technique, there is a structure shown in FIG. 4. In this mounting structure, the front end portion of the fixed shaft 107 is rotatably mounted to a panel side bracket 114, and a visor side bracket 116 is attached to the panel side bracket 114. In particular, the panel side bracket 114 is provided with an engaging piece 115 protruding downward, and an engagement portion 117 for engaging the engaging piece 115 is formed in the visor side bracket 116. Then, the panel side bracket 114 and the visor side bracket 116 are connected so as to mount the sun visor 102 by pressing the visor side bracket 116 to the engaging piece 115 protruding to a passenger's room side from the mounting opening portion formed in the roof trim 101 so that the engagement portion 117 is engaged.

However, in the mounting structure shown in FIG. 2, since a weight of the sun visor 102 is supported only by the mounting portion holding the front end portion of the fixed shaft 107, there is a problem that a moment of rotation is generated in the mounting portion and a shaky state and a foreign noise are easily generated in the mounting portion of the fixed shaft 107. Accordingly, in the mounting structure shown in FIG. 2, a fixing strength capable of resisting against the moment of rotation is required.

Further, in the mounting structure shown in FIG. 3, since the fixed shaft 107 is supported by the visor side bracket 110, it is necessary to increase an engaging strength between the engaging piece 112 of the panel side bracket 111 and the engagement portion 113 of the visor side bracket 110. Accordingly, a force required for inserting the engaging piece 112 to the engagement portion 113 is increased and there is a problem that an assembling operability and a take-out operability are deteriorated.

Further, in the mounting structure shown in FIG. 4, it is necessary to form a lock canceling hole 118 for canceling an engagement between the engaging piece 115 and the engagement portion 117 in the case of taking out the visor side bracket 116. In this mounting structure, since it is necessary to simultaneously cancel the engagement between all the engaging pieces 115 and all the engagement portions 117 within the lock canceling hole 118, an operability is bad and there is a problem that a design characteristic is deteriorated since the lock canceling hole 118 is formed.

SUMMARY OF THE INVENTION

Accordingly, the present invention has been achieved by taking the matters mentioned above into consideration, and an object of the present invention is to a bracket for mounting an auxiliary machinery to a vehicle body which can make a mounting operation and a take-out operation easy and can prevent a shaky state and a foreign sound of an auxiliary machinery from being generated.

According to a first aspect of the present invention, there is provided a vehicle body mounting bracket for fixing an auxiliary machinery to a panel in a vehicle body side comprising: a first bracket arranging and supporting the auxiliary machinery to one side; a shaft supporting portion protruded from the first bracket and fitting a fixed shaft supporting the auxiliary machinery to another side; an engaging portion formed near a peripheral wall portion of the shaft supporting portion; a second bracket holding the first bracket; an engagement portion which is formed on the second bracket and with which the engaging portion is engaged by assembling the first bracket; and fixing means fixing the first bracket and the second bracket to the panel.

According to the invention described in the first aspect structured in the manner mentioned above, the engaging portion formed near the peripheral wall portion of the shaft supporting portion protruded from another side of the first bracket is engaged with the engagement portion of the second bracket at a time of assembling the first bracket and the second bracket, thereby reinforcing a mechanical strength near the shaft supporting portion. Accordingly, since the fixed shaft of the auxiliary machinery is held not only by the shaft supporting portion of the first bracket but also the engagement portion of the second bracket, the fixed shaft of the auxiliary machinery serves to prevent the shaky state from being generated.

Next, according to a second aspect of the present invention, there is provided a bracket for mounting an auxiliary machinery to a vehicle body as described in the first aspect, further comprising an opening portion which is formed in the second bracket and to which the shaft supporting portion is inserted, and a guide holding plate forming the engagement portion to which the engaging portion is slidably inserted, in a peripheral edge portion of the opening portion.

Therefore, according to the invention described in the second aspect, in addition to the effect of the invention described in the first aspect, the shaft supporting portion of the first bracket is inserted to the opening portion formed in the second bracket. Since at this time, the engaging portion formed near the peripheral wall portion of the shaft supporting portion is inserted in a sliding manner to the engagement portion of the guide holding plate provided in the peripheral edge portion of the opening portion in the second bracket, it is possible to reinforce the shaft supporting portion only by assembling the first bracket and the second bracket.

Next, according to a third aspect of the present invention, there is provided a bracket for mounting an auxiliary machinery to a vehicle body as described in the second aspect, further comprising a locking projection locked in a state that the engaging portion is engaged with the engagement portion and formed in the engaging portion or the engagement portion.

Therefore, according to the invention described in the third aspect, since the locking projection formed in the guide portion side or the guide groove side is locked with another side in a state that guide portion is inserted to the guide groove, it is possible to assembly and hold both the elements by connecting the first bracket to the second bracket. In this case, since the locking projection locking the first bracket and the second bracket can be mounted in a so-called semi-locked state at a time of fixing both the elements to the panel, it is possible to make the mounting operation of the vehicle body mounting bracket easily.

Further, according to a fourth aspect of the present invention, there is provided a bracket for mounting an auxiliary machinery to a vehicle body as described in the third aspect, wherein the engaging portion is a guide portion protruding to a side portion of the shaft supporting portion, and the engagement portion is a guide groove formed in the guide holding plate.

Therefore, according to the invention described in the fourth aspect, in addition to the effect of the invention described in the third aspect, it is possible to achieve a smooth assembly between the first bracket and the second bracket and reinforce the strength of the shaft supporting portion by a simple structure of forming the guide groove in the guide holding plate.

Further, according to a fifth aspect of the present invention, there is provided a bracket for mounting an auxiliary machinery to a vehicle body as described in the fourth aspect, wherein the engaging portion is a step portion formed below the guide portion and engaging with the engaging projection.

Therefore, according to the invention described in the fifth aspect, in addition to the effect of the invention described in the fourth aspect, since the step portion is engaged with the engaging projection after the guide portion is slid to the guide groove, the first bracket and the second bracket can be further securely fixed to each other.

Further, according to a sixth aspect of the present invention, there is provided a bracket for mounting an auxiliary machinery to a vehicle body as described in the first aspect, wherein the second bracket is arranged in such a manner as to be brought into contact with the panel, and the first bracket is arranged in a front side in a mounting direction from the second bracket.

Therefore, according to the invention described in the sixth aspect, in addition to the effect of the invention described in the first aspect, the second bracket is brought into contact with the panel in the side of the vehicle body and firmly fixed by the fixing means. The first bracket is arranged in the front side in the mounting direction from the second bracket, however, can be fixed to the side of the panel together with the second bracket by the fixing means. Since at this time, the first bracket and the second bracket are longitudinally arranged in the mounting direction, a supporting point in the first bracket holding the shaft supporting portion and a supporting point in the second bracket holding the side of the shaft supporting portion by the engagement portion are set at different positions, so that a moment generated due to an empty weight of the auxiliary machinery applied to the fixed shaft attached to the first bracket is held by two supporting points. Accordingly, it is possible to increase rigidity near the shaft supporting portion and prevent the foreign sound generated by the shaky state of the fixed shaft from being generated.

Further, according to a seventh aspect of the present invention, there is provided a bracket for mounting an auxiliary machinery to a vehicle body as described in the first aspect, wherein the shaft supporting portion is a cylindrical body protruded from another side of the first bracket, and a cylindrical hole of the cylindrical body is formed in such a manner as to extend through the first bracket.

Therefore, according to the invention described in the seventh aspect, in addition to the effect of the invention described in the first aspect, since the shaft supporting portion is the cylindrical body, it is possible to attach the fixed shaft by inserting the fixed shaft into the cylindrical hole. Since the cylindrical body is held by the first bracket and the second bracket, it is possible to firmly support the fixed shaft inserted to the shaft supporting portion.

Further, according to an eighth aspect of the present invention, there is provided a bracket for mounting auxiliary machinery to a vehicle body as described in the seventh aspect, wherein the cylindrical body is protruded from the first bracket obliquely upward.

Therefore, according to the invention described in the eighth aspect, in addition to the effect of the invention described in the seventh aspect, since the empty weight of the auxiliary machinery can be supported by a whole surface of the lower surface of the cylindrical hole via the fixed shaft, the shaky state and the foreign sound are hard to be generated in the mounting portion.

Further, according to a ninth aspect of the present invention, there is provided a bracket for mounting an auxiliary machinery to a vehicle body as described in the first aspect, further comprising connectors arranged in the first bracket and the second bracket and connected to each other in a paired manner in a state of assembling the first and second brackets, wherein a wire connected to an electrical equipment of the auxiliary machinery is connected to the connector arranged in the first bracket, and a wire in a side of the vehicle body is connected to the connector arranged in the second bracket.

Therefore, according to the invention described in the ninth aspect, in addition to the effect of the invention described in the first aspect, it is possible to transmit an electric power and a signal to the auxiliary machinery side by assembling the first bracket and the second bracket. Since the pair of connectors provided in the first bracket and the second bracket can be automatically connected by assembling both of the brackets, it is possible to easily perform a connecting operation.

Further, according to a tenth aspect of the present invention, there is provided a bracket for mounting an auxiliary machinery to a vehicle body as described in the first aspect, wherein a spacer piece brought into contact with the other bracket so as to keep a predetermined distance with respect to the other bracket is formed in the first bracket or the second bracket.

Therefore, according to the invention described in the tenth aspect, in addition to the effect of the invention described in the first aspect, since it is possible to keep the interval between the first bracket and the second bracket at a predetermined size by the spacer piece, it is possible to the first bracket from excessively pressing a trim surface with taking a thickness of the trim into consideration, for example, in the case that the trims or the like is arranged on the panel in an overlapping manner. Further, since the interval between the first bracket and the second bracket is secured, it is possible to set a distance between a base portion of the shaft supporting portion held by the first bracket and a position held by the engagement portion of the second bracket engaged with the engaging portion formed near the peripheral wall portion of the shaft supporting portion to a long distance, so that it is possible to apply a rigidity capable of resisting against a moment generated in the fixed shaft to the shaft supporting portion.

DESCRIPTION OF THE PREFERRED EMBODIMENT

A description will be given below of details of a bracket for mounting auxiliary machinery to a vehicle body according to the present invention on the basis of an embodiment illustrated in the accompanying drawings. In this case, the present embodiment is structured such that the present invention is applied to a bracket of a sun visor (an auxiliary machinery) with an electrical equipment, for example, which is mounted to a roof trim and an inner panel in a front seat of an automobile. In this case, according to the present embodiment, as the electrical equipment, lighting means for a vanity mirror is provided in the sun visor.

Figure 5:
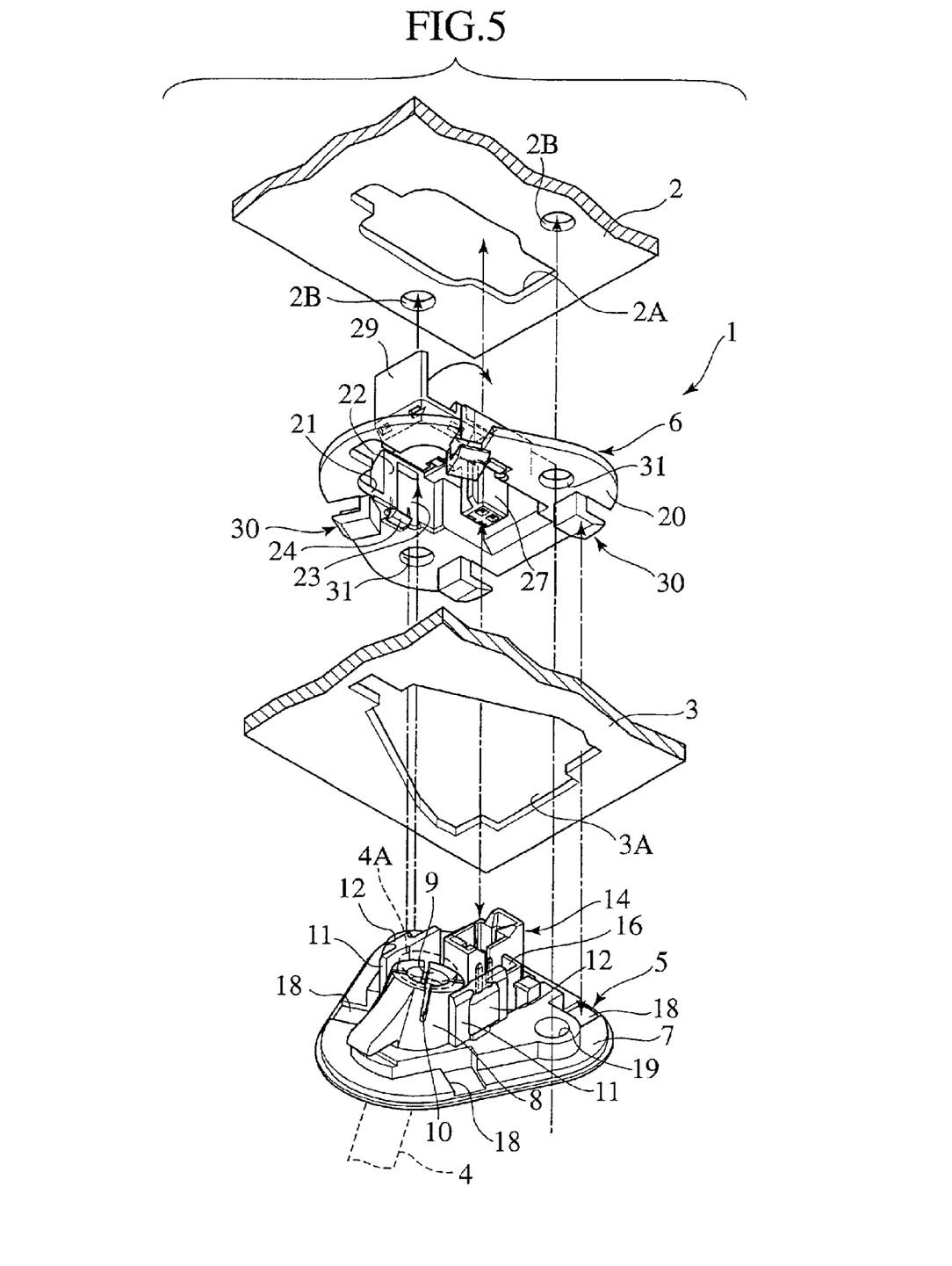
FIG. 5 is an exploded perspective view showing an embodiment of a bracket for mounting an auxiliary machinery (a sun visor) to a vehicle body according to the present invention.

As shown in FIG. 5, a vehicle body mounting bracket 1 for an auxiliary machinery according to the present invention is structured such as to fix a sun visor (not shown) to an inner panel 2 and a roof trim 3 of a vehicle body, and rotatably hold a front end portion of a pipe-shaped fixing shaft 4 to which the sun visor (not shown) is supported.

Summary of Structure of Vehicle Body Mounting Bracket

The vehicle body mounting bracket 1 according to the present embodiment is mainly constituted by a visor side bracket 5 corresponding to a first bracket and a panel side bracket 6 corresponding to a second bracket, as shown in FIG. 5. The panel side bracket 6 is mounted so as to be brought into contact with a lower surface of the inner panel 2 as shown in FIG. 5. Further, the visor side bracket 5 is arranged in an opposite side (a passenger's room side) to the panel side bracket 6 with respect to the roof trim 3 corresponding to an interior member fixed to the inner panel 2, and is fixed to the inner panel 2.

Structure of Visor Side Bracket

Figure 6:
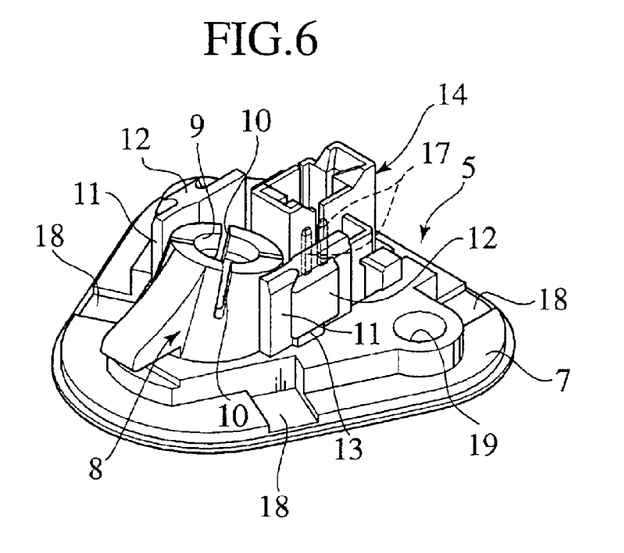
FIG. 6 is a perspective view showing a visor side bracket according to the embodiment.
Figure 7:
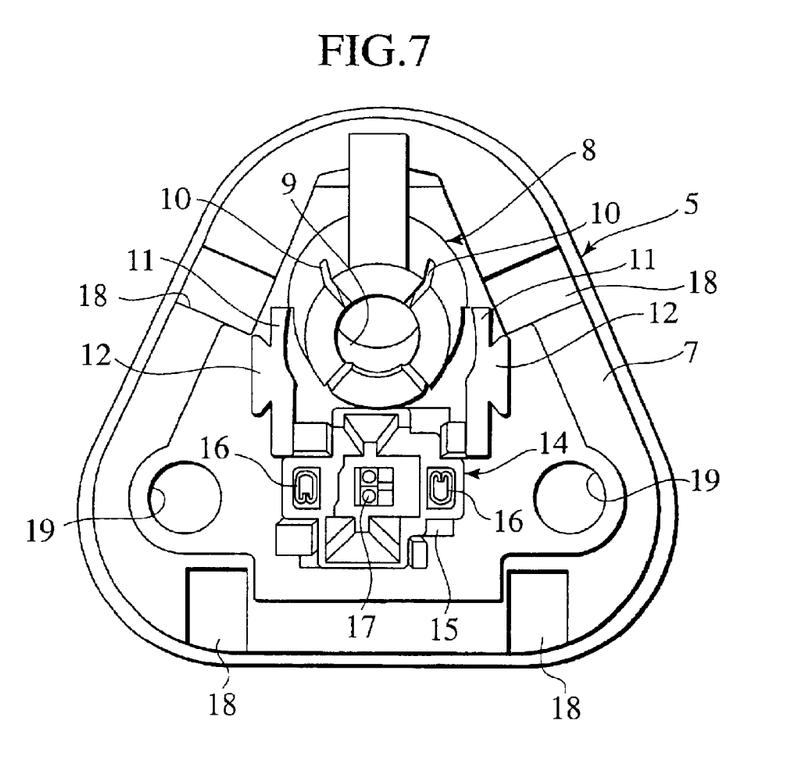
FIG. 7 is a plan view showing a visor side bracket according to the embodiment.

The visor side bracket 5 is structured, as shown in FIGS. 5 to 7, such that a cylindrical shaft supporting portion 8 rotatably holding the front end portion of the fixing shaft 4 to which the sun visor (not shown) is supported is protruded obliquely upward from a middle portion of a substantially triangular visor side bracket base plate 7. A shaft supporting hole 9 corresponding to a cylindrical hole of the shaft supporting portion 8 is formed in the shaft supporting portion 8 in such a manner as to extend through in a substantially vertical direction. Further, a plurality of (four in the present embodiment) slits 10 are formed in an upper opening end of the shaft supporting portion 8 at a uniform interval in such a manner as to cut a peripheral wall downward.

These slits 10 are formed, whereby an expanded head portion 4A formed in the front end of the fixing shaft 4 can expand the upper opening end of the shaft supporting portion 8 and be inserted at a time of being inserted to an upper opening from a lower opening of the shaft supporting portion 8, as shown in FIG. 5. In order to give to the shaft supporting portion 8 an effect that the expanded head portion 4A of the fixing shaft 4 can be inserted in the manner mentioned above, at least the shaft supporting portion 8 is formed by a material having a mechanical strength, a rigidity and a restituting property. As the material having these properties, there can be listed up a synthetic resin material, for example, a polyacetal (POM) or the like.

Reinforcing plates 11 and 11 formed near a peripheral wall portion and extending near to a terminal end of the slit 10 from a base portion of the shaft supporting portion 8 are respectively stood from both side portions of the shaft supporting portion 8 protruded upward from the visor side bracket base plate 7 in the manner mentioned above. A height of the reinforcing plate 11 is set to be substantially equal to a height of the shaft supporting portion 8. Further, a guide portion 12 corresponding to an engaging portion laterally protruded along a vertical direction is formed on an outer surface of the reinforcing plate 11.

This guide portion 12 is formed in a shape being gradually wider from the reinforcing plate 11 toward an outer side. The guide portion 12 having the shape mentioned above is received in a sliding manner in a guide groove 23 corresponding to an engagement portion formed in the panel side bracket 6 mentioned below, whereby the structure is made such that the shaft supporting portion 8 is held by the panel side bracket 6. In this case, the guide portion 12 is not formed in a lowermost portion (a base portion) of the reinforcing plate 11, and a step portion 13 is formed in a lower portion of the reinforcing plate 11 and the guide portion 12 as shown in FIG. 6.

Further, in a different area of the visor side bracket base plate 7 from the shaft supporting portion 8, as shown in FIG. 7, a connector attaching portion 15 for mounting a female connector 14 is formed. The connector attaching portion 15 is formed as a recess portion for mounting and attaching the female connector 14 near the shaft supporting portion 8, and is structured such that the female connector 14 is fitted and attached thereto without a shaky state. In this case, the female connector 14 is structured such as to be fitted to a male connector 27 provided in the panel side bracket 6 mentioned below so as to be electrically connected thereto.

Further, wire connecting portions 16 and 16 are formed in both side portions of the female connector 14. A wire W1 (refer to FIG. 11) connected to a lamp of a vanity mirror installed in the sun visor (not shown) via the cylindrical hole within the fixing shaft 4 is introduced out to the wire connecting portions 16 and 16, and an end portion of the wire is connected thereto. Further, the wire connecting portions 16 and 16 are respectively connected to connecting terminals (male terminals) 17 and 17 stood within the female connector 14.

Further, spacer contact recess portions 18 with which four spacer pieces 30 protruded downward from a peripheral edge portion of the panel side bracket 6 mentioned below are respectively fitted and brought into contact are respectively formed two portions in both sides of the shaft supporting portion 8 and two portions in the side part of the connector attaching portion 15, on the peripheral edge of the visor side bracket base plate 7. Further, fixing opening portions 19 for inserting fixing means, for example, a grommet screw, a projection for the grommet screw or the like are respectively opened in the peripheral edge portions in both sides of the connector attaching portion 15 on the visor side bracket base plate 7.

As mentioned above, the description is given of the structure of the visor side bracket 5, however, the visor side bracket 5 is structured, as shown in FIG. 5, such that the shaft supporting portion 8 and the female connector 14 are inserted from the mounting opening portion 3A formed in the roof trim 3 above the roof trim 3.

Structure of Panel Side Bracket

Figure 8:
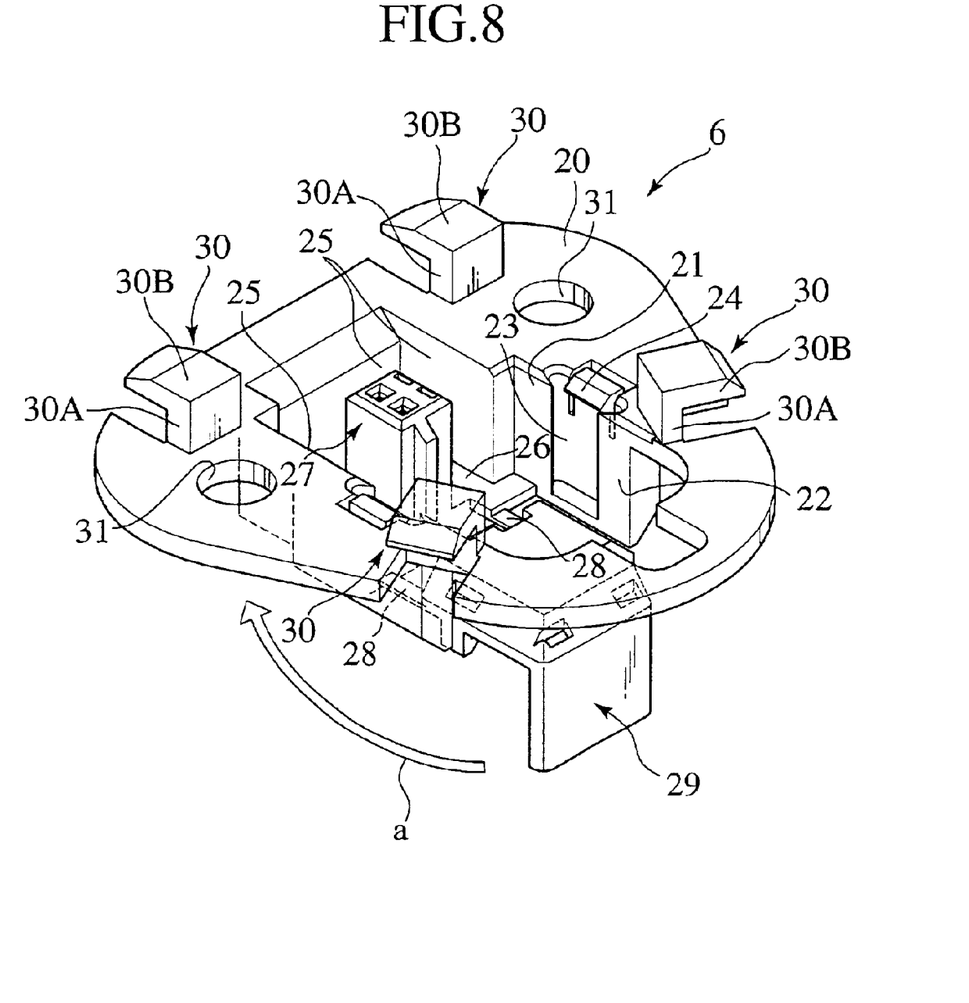
FIG. 8 is a perspective view showing a panel side bracket according to the embodiment.

FIG. 8 is a perspective view of a state that the lower surface side of the panel side bracket 6 is directed upward for the purpose of easily explaining. The panel side bracket 6 is provided with a panel side bracket base plate 20 having substantially the same shape as that of the visor side bracket 5 mentioned above, as shown in FIGS. 5 and 8. An opening portion 21 is opened at a position on the panel side bracket base plate 20 corresponding to the shaft supporting portion 8 and the female connector 14 in the visor side bracket 5. The opening portion 21 is formed so that the shaft supporting portion 8, the reinforcing plates 11 and 11 and the female connector 14 in the visor side bracket 5 can be inserted thereto.

A pair of opposing guide holding plates 22 and 22 are stood from both side edges of a portion in the opening portion 21 to which the shaft supporting portion 8 and the reinforcing plates 11 and 11 are inserted, in such a manner as to be directed above (below in FIG. 8) of the panel side bracket base plate 20. Guide grooves 23 are formed in opposing inner surfaces of the guide holding plates 22, as shown in FIG. 8. The guide groove 23 is structured such that the guide portions 12 formed in the reinforcing plates 11 in both sides of the shaft supporting portion 8 of the visor side bracket 5 mentioned above are inserted thereto in a sliding manner.

Figure 12:
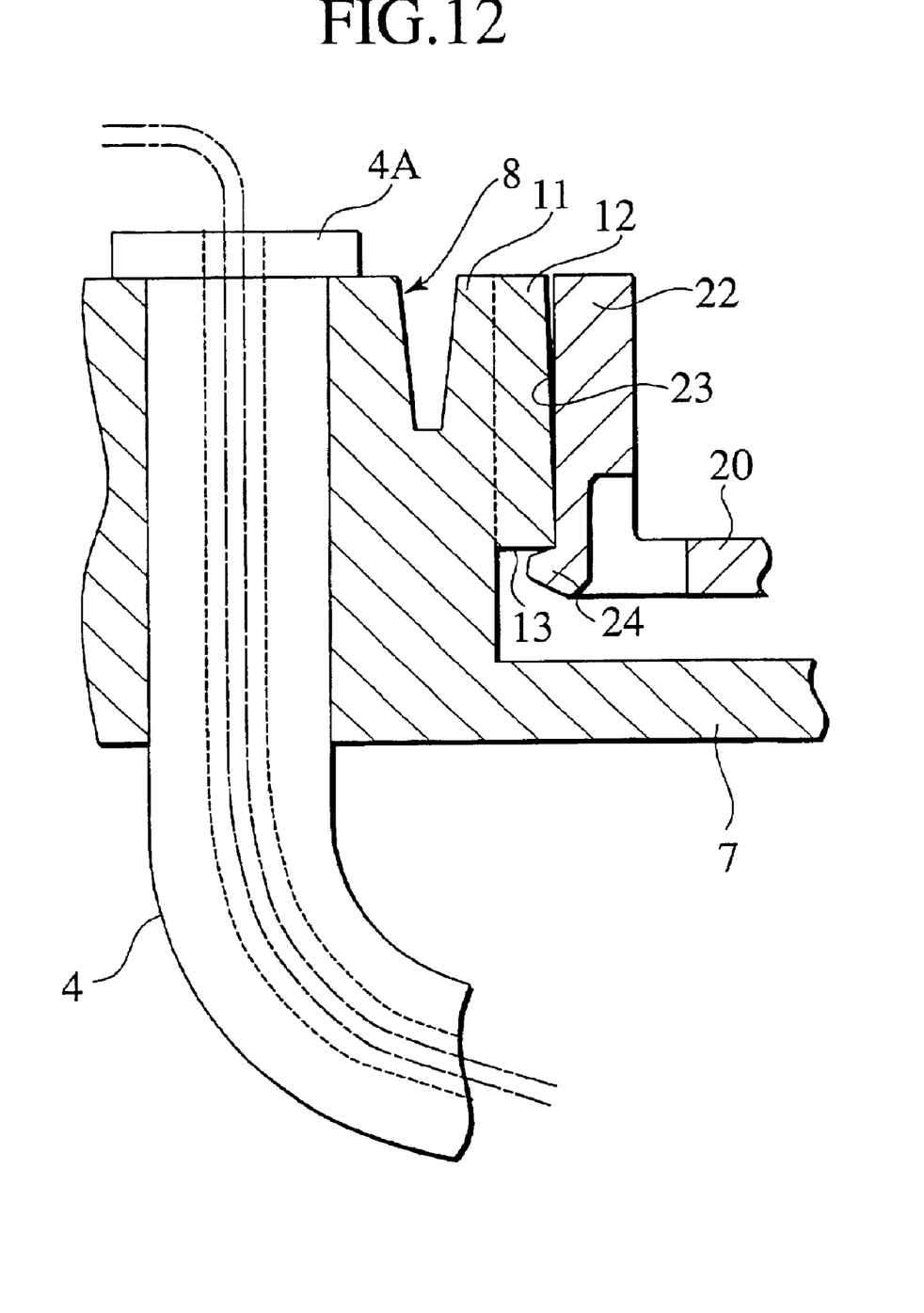
FIG. 12 is an enlarged cross sectional view of a main portion showing an engaging state between a guide portion formed near a peripheral wall portion of a shaft supporting portion and a guide groove according to the present invention.

Further, a locking projection 24 protruded toward an inner side of the opening portion 21 and having a restituting property in an inner and outer direction of the opening portion 21 is provided in a lower portion (an upper portion in FIG. 8) of the guide groove 23. The locking projection 24 has a so-called semi-lock function of engaging with the step portion 13 formed in the lower portion of the guide portion 12 so as to prevent the guide portion 12 from being taken out from the guide groove 23 when an insertion of the guide portion 12 to the guide groove 23 is completed, as shown in FIG. 12.

Further, three side walls 25 forming a space for receiving the female connector 14 are provided to the peripheral edge of the area in the opening portion 21 corresponding to the female connector 14 in such a manner as to be connected to adjacent ones. Further, a connector mounting top plate 26 is formed so as to cover the upper portion of the space formed by the side walls 25. The male connector 27 is protruded from a lower surface (an upper surface in FIG. 8) of the connector mounting top plate 26 so as to be directed downward. In this case, although an illustration is omitted, a wiring opening portion by which a wire W2 in the side of the vehicle body is inserted to the male connector 27 is formed in the connector mounting top plate 26.

Further, a wire cover 29 is provided in an edge portion of the connector mounting top plate 26 in which the side wall 25 is not formed, via hinge portions 28 and 28. The wire cover 29 is structured such as to cover and protect the wire W2 connected to the male connector 27 by being rotated in a direction of a thick arrow a shown in FIG. 8 around the hinge portion 28 corresponding to a supporting point (refer to FIG. 11).

Further, spacer pieces 30 formed as substantially L-shaped leg portions protruding downward are formed at respective positions in the panel side bracket base plate 20 corresponding to the spacer contact recess portion 18 of the visor side bracket 5. The spacer piece 30 is constituted by a suspending plate portion 30A suspended from the panel side bracket base plate 20, and a contact plate portion 30B fitted to and brought into contact with the spacer contact recess portion 18 of the visor side bracket 5. In this case, a downward protruding length of the suspending plate portion 30 is set to be slightly shorter than a thickness of the roof trim 3.

Further, fixing opening portions 31 having the same shape are formed at the positions in the panel side bracket base plate 20 corresponding to the fixing opening portions 19 formed on the visor side bracket base plate 7.

As mentioned above, the description is given of the structure of the panel side bracket 6, however, the panel side bracket 6 is attached so that the upper peripheral edge portion of the panel side bracket base plate 20 is brought into contact with the lower surface of the inner panel 2 as shown in FIG. 5. Further, a mounting opening portion 2A through which the housing portion formed by three side walls 25 of the panel side bracket 6 and a pair of guide holding plates 22 are inserted to the above of the panel is formed in the inner panel 2. Further, panel side fixing opening portions 2B and 2B are formed at positions in the peripheral edge portion of the mounting opening portion 2A corresponding to the fixing opening portions 31 formed on the panel side bracket base plate 20. In this case, a plurality of spacer pieces 30 formed so as to be suspended from the panel side bracket base plate 20 are set so as to be brought into contact with the lower surface side of the roof trim 3 via the mounting opening portion 3A formed in the roof trim 3.

Mounting Structure of Vehicle Body Mounting Bracket

Figure 9:
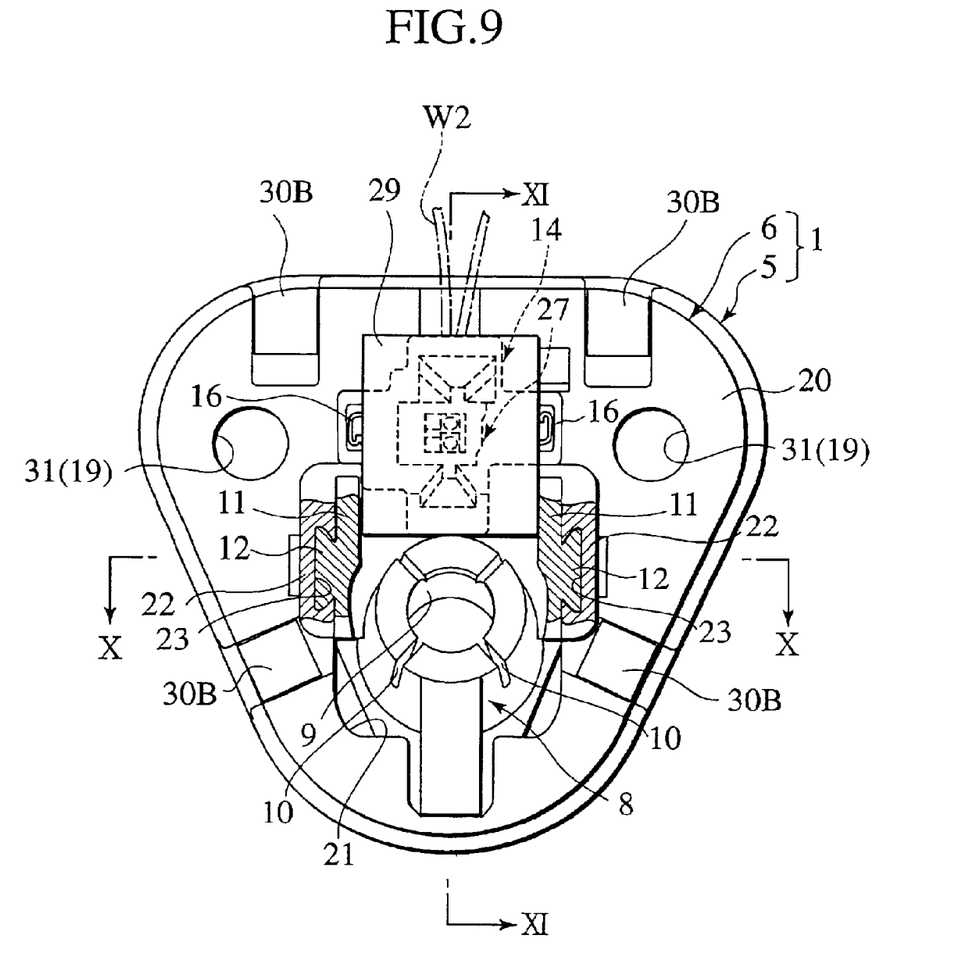
FIG. 9 is a plan view showing a state that the visor side bracket and the panel side bracket according to the present invention are assembled.
Figure 10:
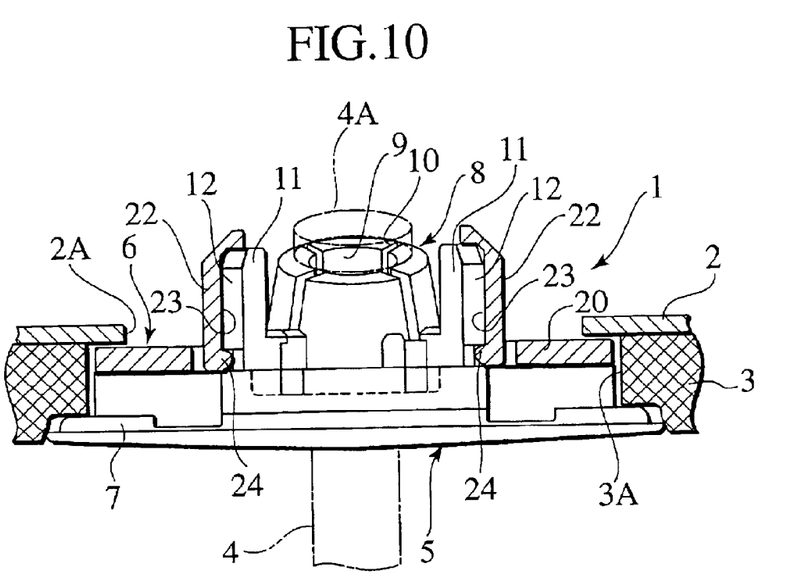
FIG. 10 is a cross sectional view along a line X—X in FIG. 9.
Figure 11:
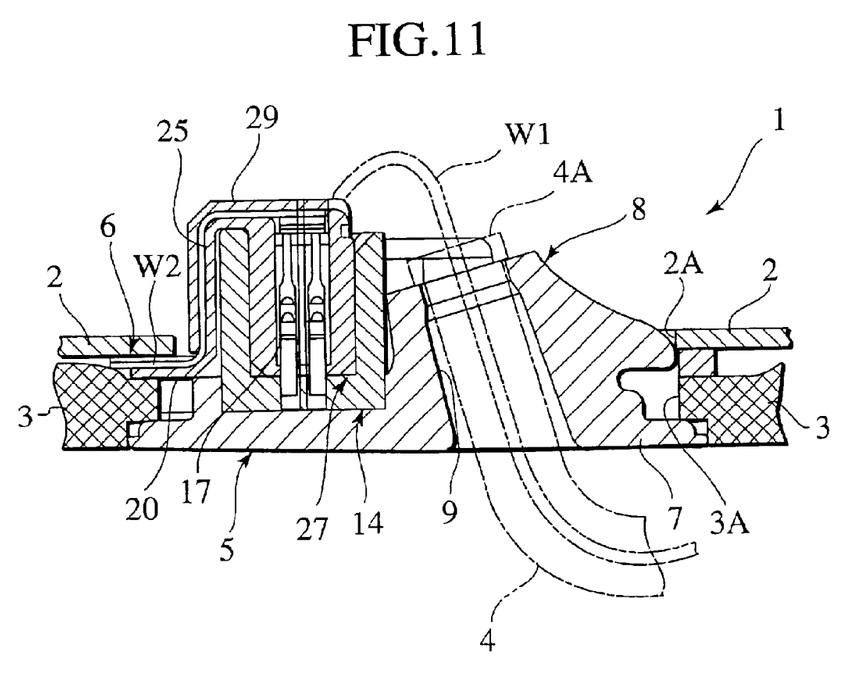
FIG. 11 is a cross sectional view along a line XI—XI in FIG. 9.

FIG. 9 is a plan view showing a state that the visor side bracket 5 and the panel side bracket 6 are assembled. FIG. 10 is a partly cross sectional view along a line X—X in FIG. 9, and FIG. 11 is a cross sectional view along a line XI—XI in FIG. 9. In this case, FIG. 9 omits an illustration of the fixing shaft 4.

As shown in FIGS. 10 and 11, the upper surface peripheral edge of the panel side bracket base plate 20 is brought into contact with the lower surface of the peripheral edge of the mounting opening portion 2A formed in the inner panel 2. The housing portion formed by three side walls 25 protruding out to the upper surface of the panel side bracket base plate 20 and a pair of guide holding plates 22 are inserted from the mounting opening portion 2A and arranged so as to protrude above the inner panel 2.

On the contrary, in the visor side bracket 5, the wire W1 connected to the lamp installed in the sun visor (not shown) is introduced out from the expanded head portion 4A through the inner portion of the fixing shaft 4, and the fixing shaft 4 of the sun visor is inserted to the shaft supporting portion 8 formed in the visor side bracket base plate 7 so as to be rotatably supported.

Further, the female connector 14 is arranged and supported in the connector attaching portion 15 of the visor side bracket base plate 7.

Further, the shaft supporting portion 8, the reinforcing plates 11 and the guide portions 12 in the visor side bracket 5 are inserted to the opening portion 21 from the lower surface side of the panel side bracket base plate 20, and the guide portions 12 are inserted to the guide grooves 23 formed in the guide holding plates 22 of the panel side bracket 6 so as to be engaged and held. In this state, the guide holding plate 22 holds the reinforcing plate 11 according to an engagement between the guide groove 23 and the guide portion 12. As mentioned above, since the reinforcing plate 11 is formed near the peripheral wall portion of the shaft supporting portion 8, the shaft supporting portion 8 is as a result held by the guide holding plates 22 from both sides.

Since the guide holding plate 22 in the panel side bracket 6 can support the shaft supporting portion 8 even when a moment is applied to the shaft supporting portion 8 via the fixing shaft 4 due to an empty weight of the sun visor, according to the mounting structure mentioned above, it is possible to increase a rigidity of the shaft supporting portion 8 so as to prevent the sun visor from being swung and a shaky state and a foreign sound in the mounting portion of the fixing shaft 4 from being generated.

Further, the female connector 14 supported to the visor side bracket 5 is inserted to the housing space formed by three side walls 25 of the panel side bracket 6, and is fitted to the male connector 27 of the panel side bracket 6 so as to be electrically connected.

In this case, in a state that the guide portion 12 is completely inserted to the guide groove 23 formed in the guide holding plate 22 in the panel side bracket 6, since the locking projection 24 of the panel side bracket 6 is engaged with the step portion 13 formed in the lower portion of the guide portion 12 and the reinforcing plate 11, the visor side bracket 5 is so-called semi-locked to the panel side bracket 6. Then, the vehicle body mounting bracket 1 constituted by the visor side bracket 5 and the panel side bracket 6 is fixed to the inner panel 2 by fixing means such as a grommet screw, a grommet screw projection or the like (not shown) in a state of coinciding the fixing opening portions 19 and 31 at the corresponding positions of the visor side bracket 5 and the panel side bracket 6 with the panel side fixing opening portions 2B in the inner panel 2.

Mounting Method of Vehicle Body Mounting Bracket

Next, a description will be given of a method of mounting the vehicle body mounting bracket 1 for the auxiliary machinery according to the present embodiment to the inner panel 2 and the roof trim 3. At first, in the visor side bracket 5, the wire W1 connected to the lamp installed in the sun visor (not shown) is introduced out from the expanded head portion 4A through the inner portion of the fixing shaft 4 and the fixing shaft 4 is inserted to the shaft supporting portion 8, whereby the fixing shaft is rotatably attached. Further, the female connector 14 is supported to the connector attaching portion 15 of the visor side bracket base plate 7 and the end portion of the wire W1 is connected to the wire connecting portion 16 of the female connector 14.

On the contrary, in the panel side bracket 6, the wire W2 arranged between the inner panel 2 and the roof trim 3 is taken out to an inner side of the passenger's room from the mounting opening portion 3A of the roof trim 3, and is connected to the male connector 27 provided in the panel side bracket 6. After connecting the wire W2 to the male connector 27, the wire cover 29 is bent from the hinge portion 28 so as to cover the wire W2 arranged along an outer side of the side wall 25.

Next, in the visor side connector 5, the shaft supporting portion 8 to which the fixing shaft 4 is attached is inserted to the opening portion 21 from the lower surface side of the panel side bracket 6, and at the same time, the female connector 14 is fitted to the male connector 27. Then, the guide portion 12 mentioned above is completely inserted to the guide groove 23 formed in the guide holding plate 22 of the panel side bracket 6, and the locking projection 24 of the panel side bracket 6 is engaged with the step portion 13 formed in the lower portion of the guide portion 12 and the reinforcing plate 11, thereby achieving a semi-locking state.

In this state, a contact plate portion 30B of the spacer piece 30 formed in the panel side bracket 6 is fitted to and brought into contact with the spacer contact recess portion 18 formed in the visor side bracket base plate 7. As a result, the visor side bracket base plate 7 and the panel side bracket base plate 20 are apart from each other at a predetermined interval by a suspending plate portion 30A of the spacer piece 30. Since a length of the suspending plate portion 30A is set to be slightly shorted than a thickness of the roof trim 3 as mentioned above, the upper surface peripheral edge of the visor side bracket base plate 7 is brought into contact with the lower surface of the roof trim 3 with a suitable contact pressure. Accordingly, it is possible to prevent folds or the like from being generated at a contact portion with the visor side bracket base plate 7 in the roof trim 3. Further, the visor side bracket base plate 7 can be uniformly brought into contact with the lower surface of the roof trim 3 by four spacer pieces 30.

Finally, the visor side bracket 5 and the panel side bracket 6 are fixed to the inner panel 2 by the fixing means such as the grommet screw, the grommet screw projection or the like in a state of coinciding the fixing opening portions 19 and 31 at the corresponding positions of the visor side bracket 5 and the panel side bracket 6 with the panel side fixing opening portion 2B of the inner panel 2.

Here, in the case of taking out the vehicle body mounting bracket 1 mounted in this manner from the inner panel 2, it is possible to easily take out the visor side bracket 5 from the panel side bracket 6 by lightly taking out the visor side bracket 5 in a vertical direction after taking out the grommet screw projection and the grommet screw, thereby taking out the locking projection 24 of the panel side bracket 6 engaged with the step portion 13 of the visor side bracket 5.

As mentioned above, the description is given of the embodiment, however, the present invention is not limited to this, and it is possible to employ various kinds of modifications belonging to the summary of the structure. For example, in the embodiment mentioned above, the guide portion 12 is provided near the peripheral wall portion of the shaft supporting portion 8, however, the guide portion 12 may be integrally formed with the peripheral wall portion of the shaft supporting portion 8.

Further, the embodiment mentioned above is an example obtained by applying the present invention to the vehicle body mounting bracket for the sun visor, however, it is possible to apply the present invention as a vehicle body mounting bracket for a movable room lamp and a vehicle body mounting bracket for the other auxiliary machinery.

Further, in the embodiment mentioned above, the spacer piece 30 is formed in the panel side bracket 6, however, the structure may be made such that the spacer piece is provided in the visor side bracket 5.

What is claimed is:

1. A vehicle body mounting bracket for fixing an auxiliary machinery to a panel in a vehicle body side, comprising:
   a first bracket arranging and supporting said auxiliary machinery to one side;
   a shaft supporting portion protruded from said first bracket and fitting a fixed shaft supporting said auxiliary machinery to another side;
   an engaging portion formed adjacent a peripheral wall portion of said shaft supporting portion;
   a second bracket holding said first bracket;
   an engagement portion adapted so that the engaging portion is slidably inserted into the engagement portion; and
   fixing means fixing said first bracket and said second bracket to said panel, wherein said second bracket is arranged in such a manner as to be brought into contact with said panel, and said first bracket is arranged in a front side in a mounting direction from said second bracket;
   an opening portion which is formed in said second bracket and to which said shaft supporting portion is inserted; and a guide holding plate forming the engagement portion, in a peripheral edge portion of said opening portion.

2. A bracket for mounting an auxiliary machinery to a vehicle body according to claim 1, further comprising a locking projection locked in a state that said engaging portion is engaged with said engagement portion and formed in said engaging portion or said engagement portion.

3. A bracket for mounting an a xiliary machinery to a vehicle body according to claim 2, wherein said engaging portion includes a guide portion protruding to a side portion of said shaft supporting portion, and said engagement portion is a guide groove formed in said guide holding plate.

4. A bracket for mounting an auxiliary machinery to a vehicle body according to claim 3, wherein said engaging portion also includes a step portion formed below said guide portion and engaging with said locking projection.

5. A vehicle body mounting bracket for fixing an auxiliary machinery to a panel in a vehicle body side, comprising:
   a first bracket arranging and supporting said auxiliary machinery to one side;
   a shaft supporting portion protruded from said first bracket and fitting a fixed shaft supporting said auxiliary machinery to another side;
   an engaging portion formed adjacent a peripheral wall portion of said shaft supporting portion;
   a second bracket holding said first bracket;
   an engagement portion adapted so that the engaging portion is slidably inserted into the engagement portion; and
   fixing means fixing said first bracket and said second bracket to said panel, wherein said second bracket is arranged in such a manner as to be brought into contact with said panel, and said first bracket is arranged in a front side in a mounting direction from said second bracket; and
   connectors arranged in said first bracket and said second bracket and connected to each other in a paired manner in a state of assembling the first and second brackets, wherein a wire connected to an electrical equipment of the auxiliary machinery is connected to said connector arranged in said first bracket, and a wire in a side of the vehicle body is connected to said connector arranged in said second bracket.

6. A vehicle body mounting bracket for fixing an auxiliary machinery to a panel in a vehicle body side, comprising:
   a first bracket arranging and supporting said auxiliary machinery to one side;
   a shaft supporting portion protruded from said first bracket and fitting a fixed shaft supporting said auxiliary machinery to another side;
   an engaging portion formed adjacent a peripheral wall portion of said shaft supporting portion;
   a second bracket holding said first bracket;
   an engagement portion adapted so that the engaging portion is slidably inserted into the engagement portion; and
   fixing means fixing said first bracket and said second bracket to said panel, wherein said second bracket is arranged in such a manner as to be brought into contact with said panel, and said first bracket is arranged in a front side in a mounting direction from said second bracket; and
   a spacer piece formed in one of said first bracket and said second bracket and brought into contact the other of said first and second brackets so as to keep a predetermined distance with respect to said other of said first and second brackets.

7. A vehicle body mounting bracket for fixing an auxiliary machinery to a panel in a vehicle body side, comprising:
   a first bracket arranging and supporting said auxiliary machinery to one side;
   a shaft supporting portion protruded from said first bracket and fitting a fixed shaft supporting said auxiliary machinery to another side;
   an engaging portion formed near a peripheral wall portion of said shaft supporting portion;
   a second bracket holding said first bracket;
   an engagement portion which is formed on said second bracket and with which said engaging portion is engaged by assembling said first bracket; and
   fixing means fixing said first bracket and said second bracket to said panel;

an opening portion which is formed in said second bracket and to which said shaft supporting portion is inserted;

a guide holding plate forming the engagement portion to which said engaging portion is slidably inserted, in a peripheral edge portion of said opening portion; and a locking projection locked in a state that said engaging portion is engaged with said engagement portion and formed in said engaging portion or said engagement portion, wherein said engaging portion includes a guide portion protruding to a side portion of said shaft supporting portion, and said engagement portion is a guide groove formed in said guide holding plate.

8. A bracket for mounting an auxiliary machinery to a vehicle body according to claim 7, wherein said engaging portion also includes a step portion formed below said guide portion and engaging with said locking projection.

9. A vehicle body mounting bracket for fixing an auxiliary machinery to a panel in a vehicle body side, comprising:

a first bracket arranging and supporting said auxiliary machinery to one side;

a shaft supporting portion protruded from said first bracket and fitting a fixed shaft supporting said auxiliary machinery to another side;

an engaging portion formed near a peripheral wall portion of said shaft supporting portion;

a second bracket holding said first bracket;

an engagement portion which is formed on said second bracket and with which said engaging portion is engaged by assembling said first bracket; and fixing means fixing said first bracket and said second bracket to said panel; and connectors arranged in said first bracket and said second bracket and connected to each other in a paired manner in a state of assembling the first and second brackets, wherein a wire connected to an electrical equipment of the auxiliary machinery is connected to said connector arranged in said first bracket, and a wire in a side of the vehicle body is connected to said connector arranged in said second bracket.

10. A vehicle body mounting bracket for fixing an auxiliary machinery to a panel in a vehicle body side, comprising:

a first bracket arranging and supporting said auxiliary machinery to one side;

a shaft supporting portion protruded from said first bracket and fitting a fixed shaft supporting said auxiliary machinery to another side;

an engaging portion formed near a peripheral wall portion of said shaft supporting portion;

a second bracket holding said first bracket;

an engagement portion which is formed on said second bracket and with which said engaging portion is engaged by assembling said first bracket; and fixing means fixing said first bracket and said second bracket to said panel; and a spacer piece formed in one of said first bracket and said second bracket and brought into contact the other of said first and second brackets so as to keep a predetermined distance with respect to said other of said first and second brackets.

* * * * *

UNITED STATES PATENT AND TRADEMARK OFFICE
CERTIFICATE OF CORRECTION

PATENT NO. : 6,799,743 B2
DATED : October 5, 2004
INVENTOR(S) : Masahiro Sawayanagi It is certified that error appears in the above-identified patent and that said Letters Patent is hereby corrected as shown below:

Column 11,
Line 57, "a xiliary" should read -- auxiliary --.

Column 12,
Line 48, "contact the" should read -- contact with the --.

Column 14,
Line 29, "contact the" should read -- contact with the --.

Signed and Sealed this

Eleventh Day of October, 2005

JON W. DUDAS
*Director of the United States Patent and Trademark Office*